(12) United States Patent
Uchimura et al.

(10) Patent No.: US 11,870,324 B2
(45) Date of Patent: Jan. 9, 2024

(54) MOTOR HAVING DECELERATION MECHANISM

(71) Applicant: MITSUBA Corporation, Gunma (JP)

(72) Inventors: Hiroyuki Uchimura, Gunma (JP); Kazuaki Aoki, Gunma (JP)

(73) Assignee: MITSUBA Corporation, Gunma (JP)

( * ) Notice: Subject to any disclaimer, the term of this patent is extended or adjusted under 35 U.S.C. 154(b) by 260 days.

(21) Appl. No.: 16/636,912

(22) PCT Filed: Jun. 26, 2018

(86) PCT No.: PCT/JP2018/024086
§ 371 (c)(1),
(2) Date: Feb. 6, 2020

(87) PCT Pub. No.: WO2019/044139
PCT Pub. Date: Mar. 7, 2019

(65) Prior Publication Data
US 2020/0373809 A1    Nov. 26, 2020

(30) Foreign Application Priority Data
Aug. 30, 2017    (JP) .................................. 2017-164896

(51) Int. Cl.
*H02K 7/116* (2006.01)
*F16H 1/16* (2006.01)
(Continued)

(52) U.S. Cl.
CPC ........... *H02K 7/1166* (2013.01); *F16H 1/166* (2013.01); *E05F 15/697* (2015.01); (Continued)

(58) Field of Classification Search
CPC ........ H02K 7/1166; F16H 1/166; F16H 55/22
See application file for complete search history.

(56) References Cited

U.S. PATENT DOCUMENTS 1,902,683 A * 3/1933 Wildhaber .............. F16H 55/22
74/458
9,878,735 B2 * 1/2018 Kikuchi .................... B23F 5/22
(Continued)

FOREIGN PATENT DOCUMENTS

| CN | 1363785 | 8/2002 |
|---|---|---|
| CN | 105610276 | 5/2016 |

(Continued)

OTHER PUBLICATIONS

"International Search Report (Form PCT/ISA/210) of PCT/JP2018/024086", dated Sep. 11, 2018, with English translation thereof, pp. 1-4.

(Continued)

*Primary Examiner* — Jake Cook
(74) *Attorney, Agent, or Firm* — JCIPRNET

(57) ABSTRACT

Because the pressure angle $\beta°$ ($=12°$) of teeth (47) of a worm wheel (46) is larger than the pressure angle $\alpha°$ ($=11°$) of teeth (45) of a worm (44), tips of the teeth (47) of the worm wheel (46) can be more tapered as compared with a case in which the pressure angle of the teeth of the worm and the pressure angle of the teeth of the worm wheel are the same angle (the conventional case). Thereby, it is possible to ensure non-contact of teeth, which had been variable in terms of contact and non-contact in the case of the conventional form, even if there has been non-uniformity in the teeth (47) of the worm wheel (46).

5 Claims, 9 Drawing Sheets

(51) Int. Cl.
*E05F 15/697* (2015.01)
*F16H 55/22* (2006.01)
*F16H 57/021* (2012.01)

(52) U.S. Cl.
CPC .......... *E05Y 2900/55* (2013.01); *F16H 55/22* (2013.01); *F16H 2057/0213* (2013.01)

(56) References Cited

U.S. PATENT DOCUMENTS

| | | |
|---|---|---|
| 2010/0212444 A1 | 8/2010 | Smith |
| 2016/0339947 A1 | 11/2016 | Kikuchi |

FOREIGN PATENT DOCUMENTS

| | | |
|---|---|---|
| JP | 2002106685 | 4/2002 |
| JP | 2002139127 | 5/2002 |
| JP | 2004028216 | 1/2004 |
| JP | 2004066947 | 3/2004 |
| JP | 2005170249 | 6/2005 |
| JP | 2010221855 | 10/2010 |
| JP | 2012017831 | 1/2012 |
| JP | 2016217469 | 12/2016 |
| WO | 2011118448 | 9/2011 |

OTHER PUBLICATIONS

Office Action of China Counterpart Application, with English translation thereof, dated Jul. 27, 2022, pp. 1-11.

\* cited by examiner

MOTOR HAVING DECELERATION MECHANISM

CROSS-REFERENCE TO RELATED APPLICATION

This application is a 371 application of the International PCT application serial no. PCT/JP2018/024086, filed on Jun. 26, 2018, which claims the priority benefits of Japan Patent Application No. 2017-164896, filed on Aug. 30, 2017. The entirety of the above—mentioned patent application is hereby incorporated by reference herein and made a part of this specification.

BACKGROUND OF THE INVENTION

Technical Field

The present invention relates to a motor having deceleration mechanism which decelerates and outputs rotation of an armature shaft.

Related Art

Conventionally, a motor having deceleration mechanism that is small in size and can provide a large output is used in a drive source of a power window device, a sunroof device, or the like mounted on a vehicle such as an automobile or the like. The motor having deceleration mechanism is driven by an operation of an operation switch or the like in the vehicle interior, and thereby opens and closes the window glass, the sunroof, or the like.

In the motor having deceleration mechanism used in a drive source of a power window device, a sunroof device or the like, for example, a technique described in patent literature 1 is known. The motor having deceleration mechanism described in patent literature 1 includes a motor portion and a gear portion. Besides, an armature shaft is arranged in the motor portion, and a worm rotated by the armature shaft and a worm wheel engaged with the worm are arranged in the gear portion.

In addition, among the parts constituting the motor having deceleration mechanism, the worm wheel is a large part. Thus, in order to lightening the motor having deceleration mechanism, a worm wheel made of resin is employed. On the other hand, the worm rotating the worm wheel is made of steel because a large load is applied to the teeth of the worm.

LITERATURE OF RELATED ART

Patent Literature

Patent literature 1: Japanese Patent Laid-Open No. 2012-017831

SUMMARY

Problems to be Solved

Meanwhile, the worm and the worm wheel forming the deceleration mechanism are generally designed so that the pressure angle of the teeth of the worm and the pressure angle of the teeth of the worm wheel are the same angle when the specifications of the worm and the worm wheel are determined. Thereby, in theory, the worm and the worm wheel can be engaged properly and rotate smoothly with respect to each other.

However, in the motor having deceleration mechanism described in patent literature 1 described above, the worm is made of steel and the worm wheel is made of resin. Therefore, the worm can be molded with high precision by cutting or the like, but the worm wheel is cooled and cured after injection-molding of a molten resin material, and thus the precision decreases easily due to shrinkage or the like of the resin. Accordingly, in the worm wheel made of resin, non-uniformity in shape also generates easily among the plurality of teeth.

Specifically, if there is non-uniformity in the teeth of the worm wheel, the number of engagement points (see black circles in FIGS. 8 and 9) between the teeth of the worm and the teeth of the worm wheel is not constant (as designed) during one rotation of the worm wheel, and the number of engagement points increases or decreases during one rotation of the worm wheel. The increase/decrease in the number of engagement points causes non-uniformity in the rotation resistance of the deceleration mechanism, which consequently leads to a fluctuation in the load on the motor portion.

Then, when the fluctuation in the load on the motor section is large, a fluctuation in the drive current (a current fluctuation) to the motor portion also becomes large, which may cause a problem that control of the motor portion with high precision becomes difficult.

In addition, a Hall IC for detecting the rotation speed of the worm is arranged in the motor having deceleration mechanism described in patent literature 1. Thereby, a controller detects reduction in the rotation speed of the worm, that is, clamping of an object or the like, corresponding to a fluctuation in the pulse signal (a pulse fluctuation) from the Hall IC, and stops the rotation of the motor portion. Then, the increase/decrease in the number of engagement points between the teeth of the worm and the teeth of the worm wheel may also affect the detection precision of the clamping of object or the like.

For example, when the number of engagement points increases and the worm is difficult to rotate even though the object or the like is not clamped, the controller detects this pulse fluctuation and misrecognizes that there was clamping of the object or the like. Accordingly, the motor portion may be stopped while the window glass is being opened and closed.

As described above, the reduction in the precision of the teeth of the worm wheel made of resin causes an increase in the current fluctuation or the pulse fluctuation, which consequently makes it difficult to control the motor having deceleration mechanism with high precision.

An objective of the present invention is to provide a motor having deceleration mechanism which can reduce a current fluctuation and a pulse fluctuation and thereby perform more precise control even if the precision of a worm wheel is low.

Means to Solve Problems

In one aspect of the present invention, a motor having deceleration mechanism which decelerates and outputs rotation of an armature shaft includes a worm rotated by the armature shaft, and a worm wheel engaged with the worm, wherein the pressure angle of teeth of the worm wheel is larger than the pressure angle of teeth of the worm.

In another aspect of the present invention, the worm is made of steel, and the worm wheel is made of resin.

In another aspect of the present invention, the shape of the teeth of the worm wheel is the same on one side and the other side along a rotation direction of the worm wheel.

In another aspect of the present invention, when a line segment passing through an axial center of the worm wheel and orthogonal to an axial line of the worm is set as a reference line, the number of engagement points between the teeth of the worm and the teeth of the worm wheel is larger on the rotation direction side of the worm wheel with respect to the reference line than on the opposite side to the rotation direction side of the worm wheel with respect to the reference line.

Effect

According to the present invention, because the pressure angle of the teeth of the worm wheel is larger than the pressure angle of the teeth of the worm, the tips of the teeth of the worm wheel can be more tapered as compared with a case in which the pressure angle of the teeth of the worm and the pressure angle of the teeth of the worm wheel are the same angle (conventional form). Thereby, it is possible to ensure non-contact of the teeth which, in the case of the conventional form had been variable in terms of contact or non-contact, even if there has been non-uniformity in the teeth of the worm wheel.

Accordingly, the increase/decrease in the number of engagement points between the teeth of the worm and the teeth of the worm wheel during one rotation of the worm wheel can be suppressed, and the engagement between the worm and the worm wheel can be made smooth. Therefore, a current fluctuation or a pulse fluctuation can be reduced, and more precise control can be performed.

DESCRIPTION OF THE EMBODIMENTS

Hereinafter, an embodiment of the present invention is described in detail with reference to the drawings.

Figure 1:
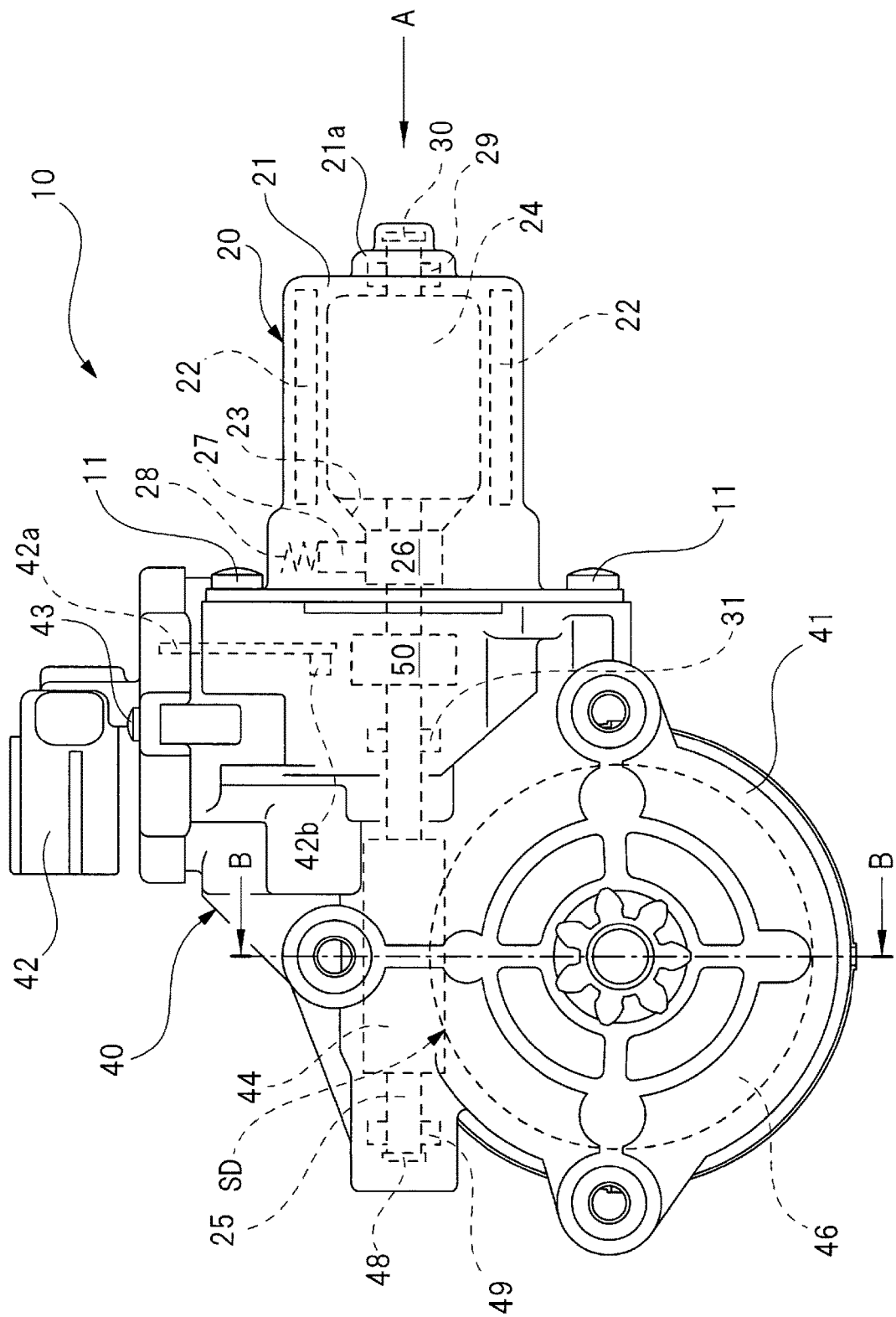
FIG. 1 is a plan view showing a motor having deceleration mechanism of the present invention.
Figure 2:
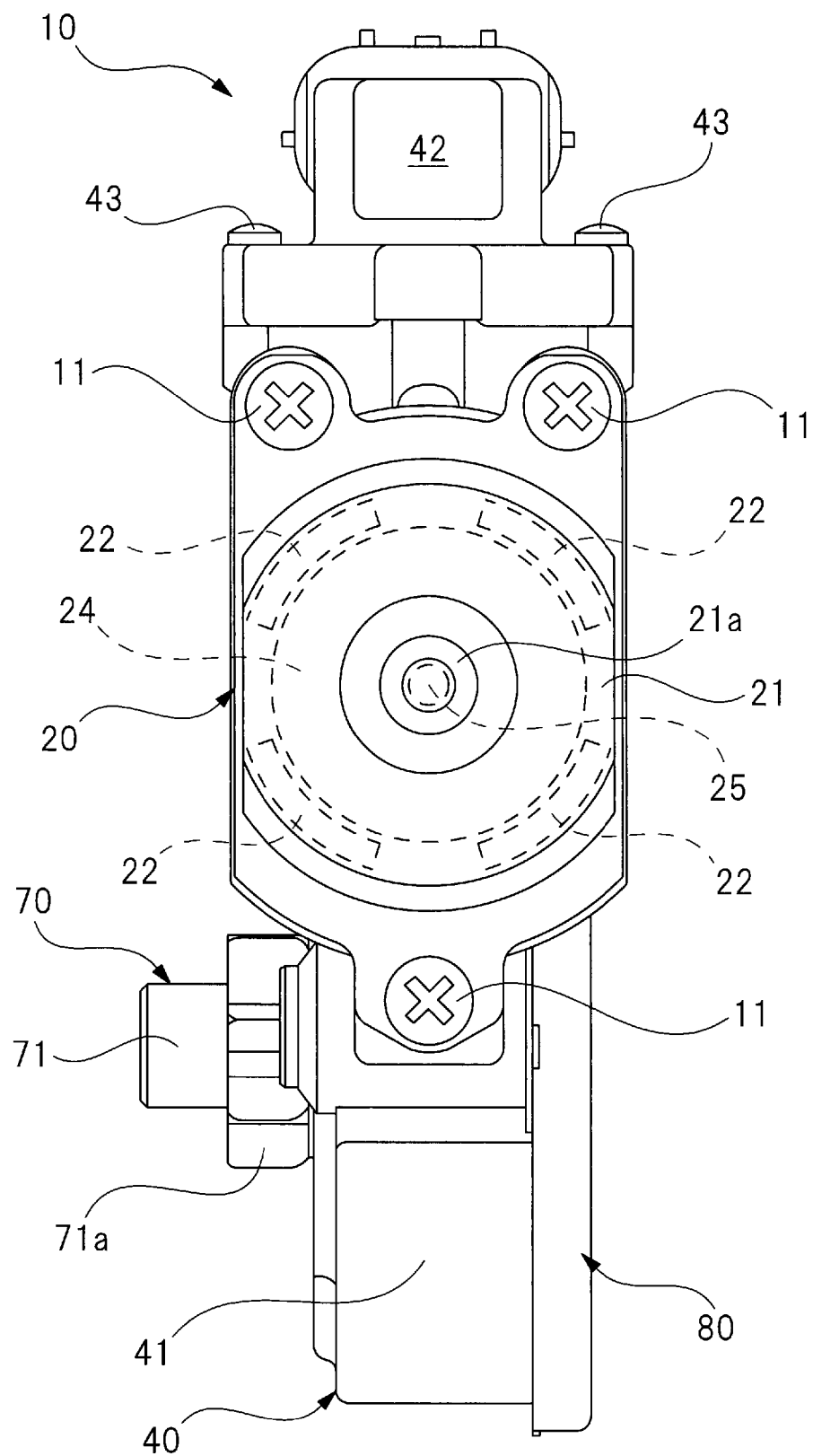
FIG. 2 is a diagram taken along an arrow A in FIG. 1.
Figure 3:
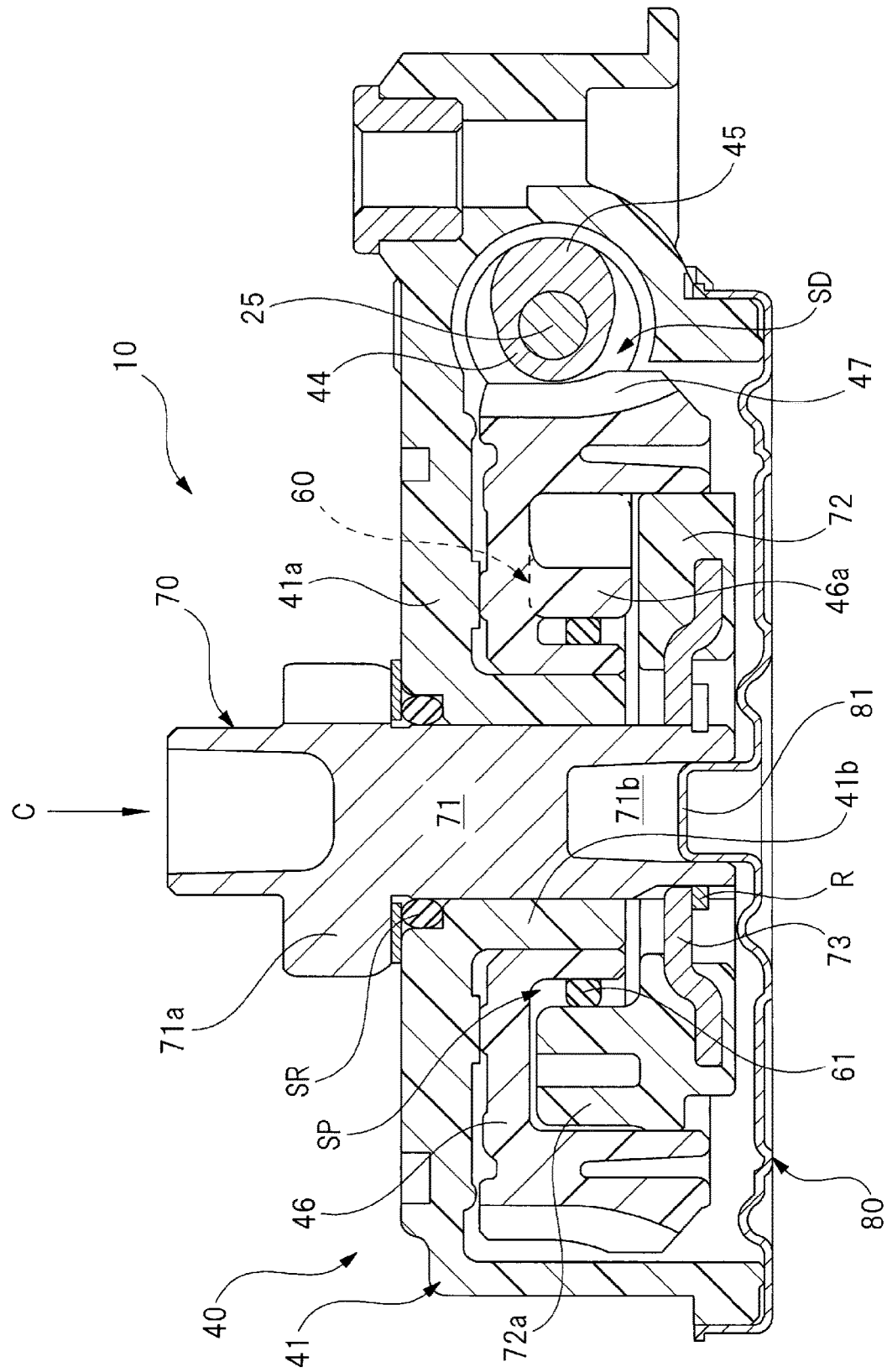
FIG. 3 is a cross-sectional view taken along a line B-B in FIG. 1.
Figure 4:
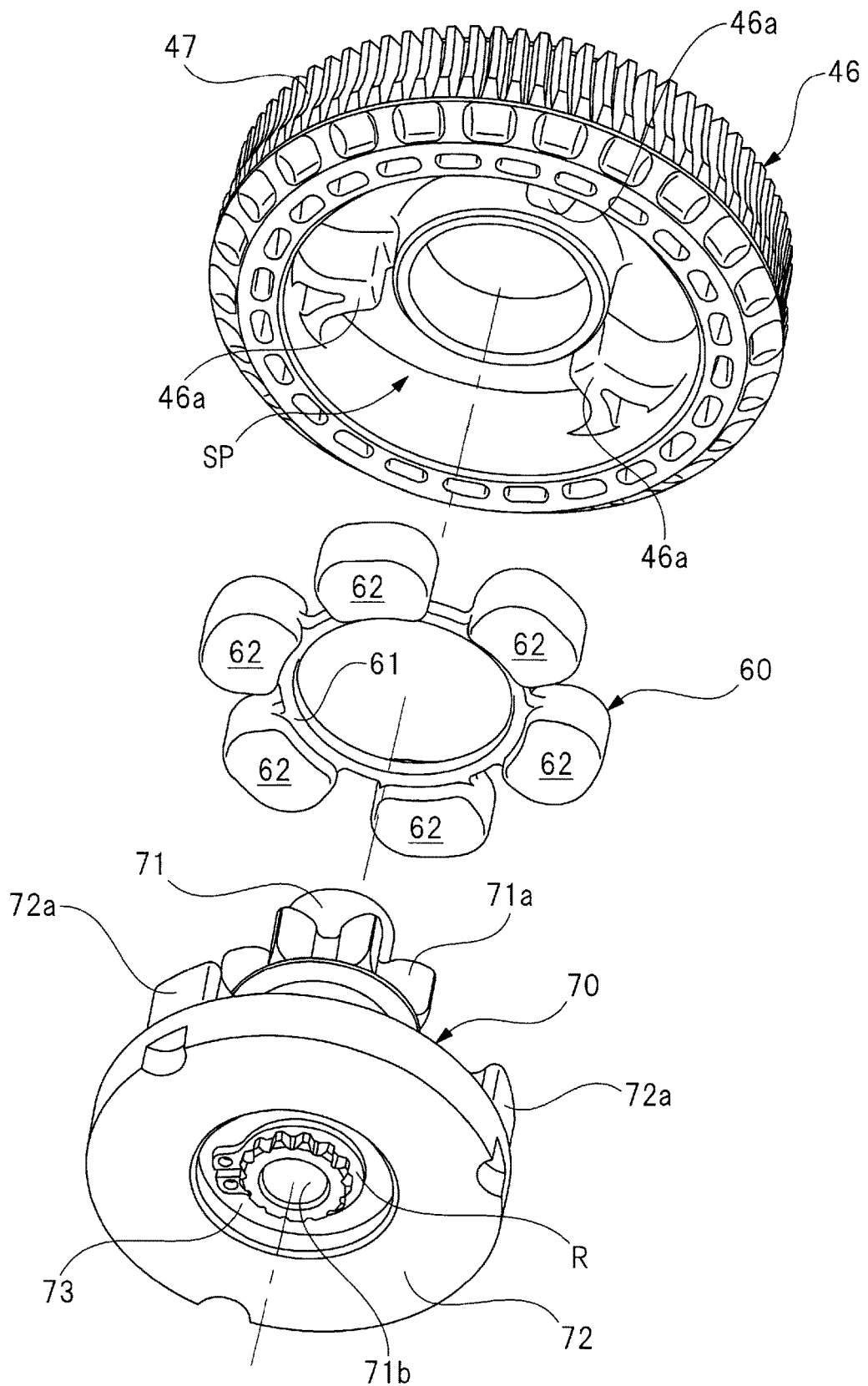
FIG. 4 is an exploded perspective view showing a worm wheel, a damper member, and an output member.
Figure 5:
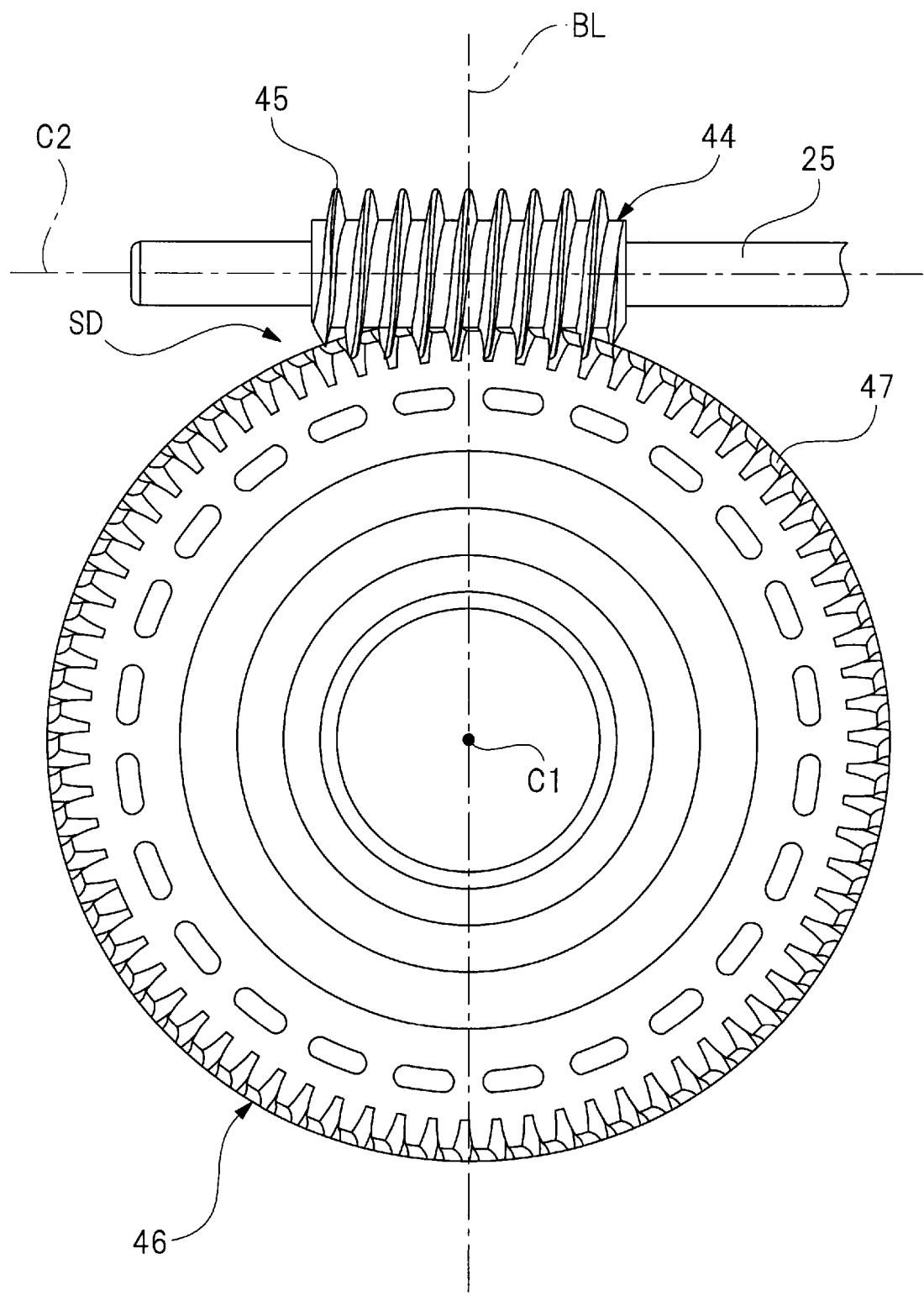
FIG. 5 is a plan view in which the woiui and the worm wheel are viewed from the direction of an arrow C in FIG. 3.
Figure 6A:
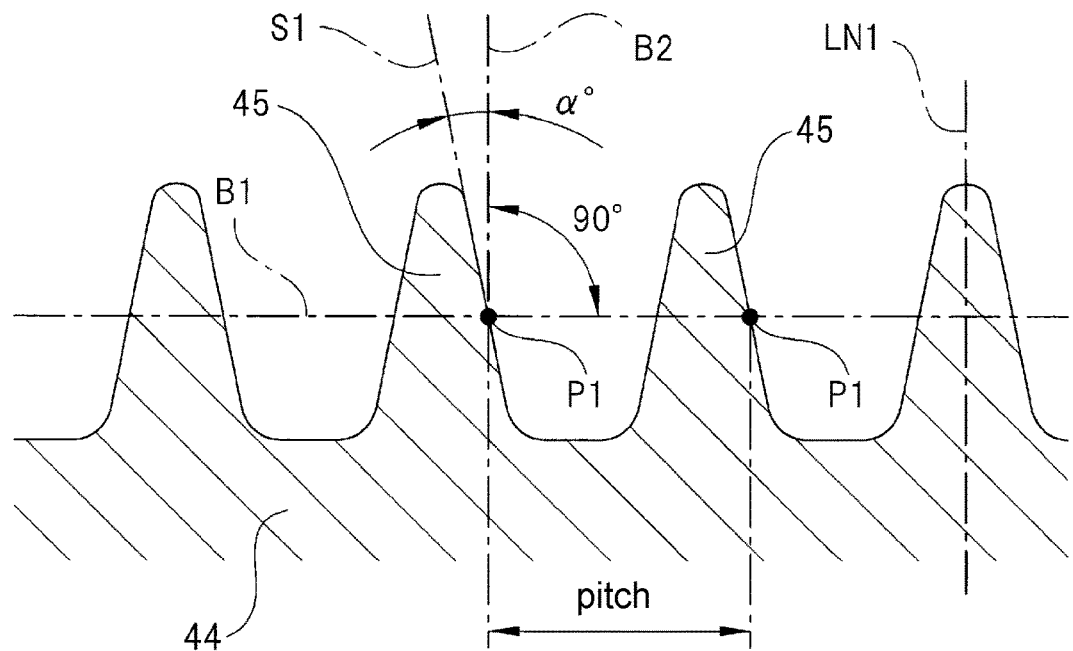
FIG. 6(a) is a cross-sectional view illustrating the shape of teeth of (reference rack tooth profile) of the worm.
Figure 6B:
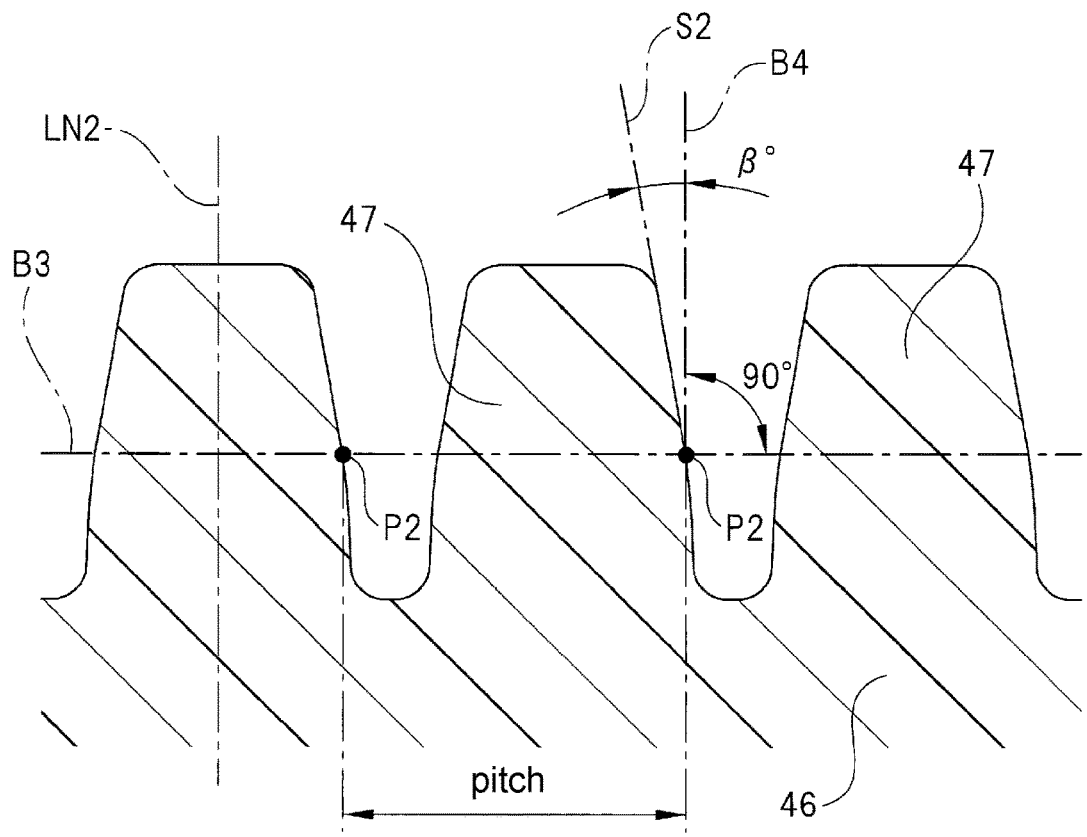
FIG. 6(b) is a cross-sectional view illustrating the shape of teeth (reference rack tooth profile) of the worm wheel.
Figure 7:
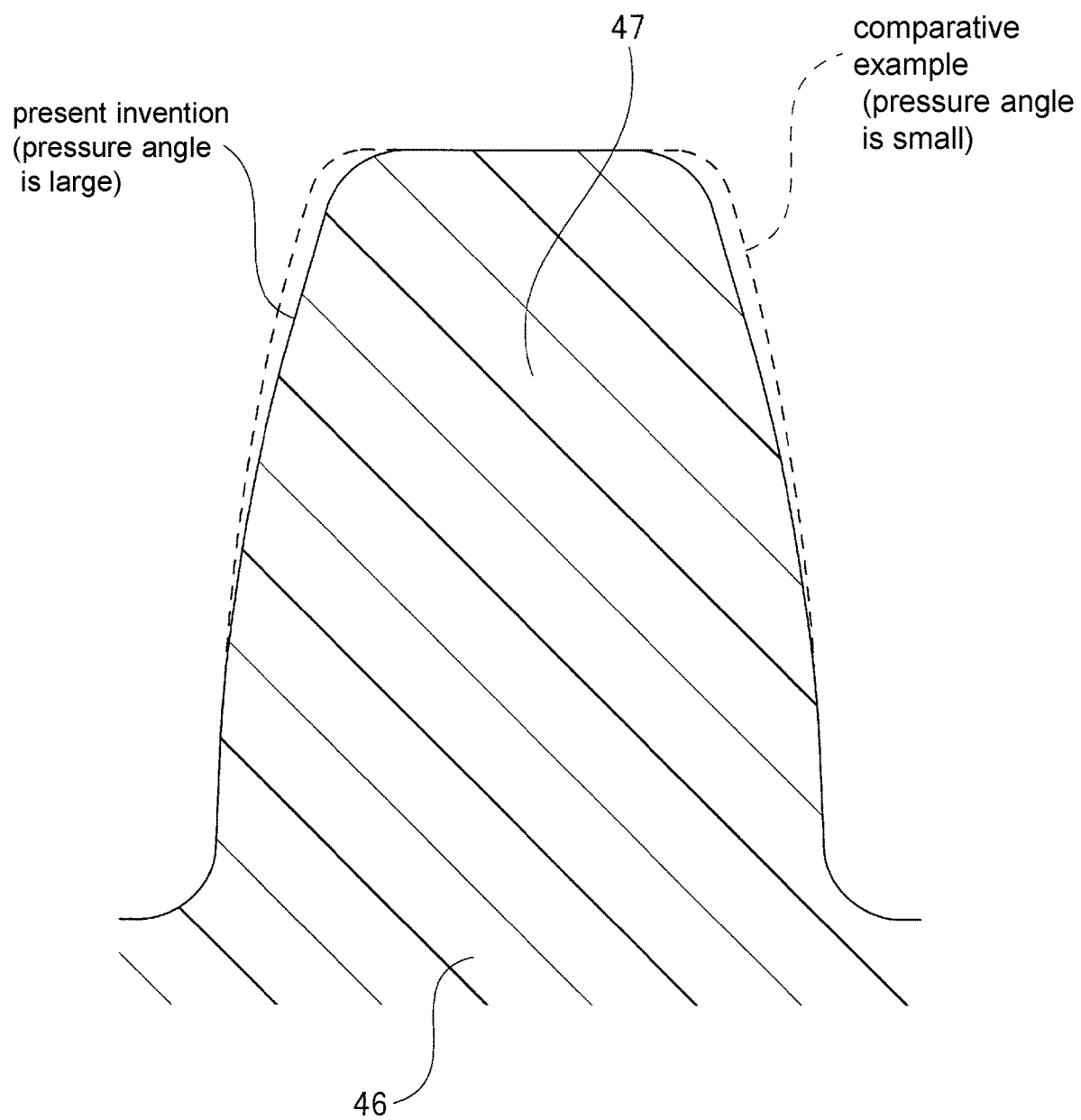
FIG. 7 is a diagram in which the shape of the teeth of the worm wheel is compared between the present invention and a comparative example.

FIG. 1 shows a plan view showing a motor having deceleration mechanism of the present invention; FIG. 2 shows a diagram taken long an arrow A in FIG. 1; FIG. 3 shows a cross-sectional view taken along a line B-B in FIG. 4; FIG. 4 shows an exploded perspective view showing a worm wheel, a damper member, and an output member; FIG. 5 shows a plan view in which the worm and the worm wheel are viewed from the direction of an arrow C in FIG. 3; FIG. 6(a) shows a cross-sectional view illustrating the shape of teeth (reference rack tooth profile) of the worm, and FIG. 6(b) shows a cross-sectional view illustrating the shape of teeth (reference rack tooth profile) of the worm wheel; and FIG. 7 shows a diagram in which the shape of the teeth of the worm wheel is compared between the present invention and a comparative example.

A motor having deceleration mechanism 10 shown in FIG. 1 is used in a drive source of a power window device mounted on a vehicle such as an automobile or the like, and drives a window regulator (not shown) that raises and lowers window glass. The motor having deceleration mechanism 10 is installed in a narrow space in the door of the vehicle, and thus has a flat shape as shown in FIG. 2. The motor having deceleration mechanism 10 includes a motor portion 20 and a gear portion 40, and the motor portion 20 and the gear portion 40 are integrated (unified) with each other by three fastening screws 11.

As shown in FIG. 1, the motor portion 20 includes a motor case 21. The motor case 21 is formed into a bottomed tubular shape by performing deep drawing on a steel plate made of magnetic material. Inside the motor case 21, as shown in FIG. 2, four magnets 22 (only two are shown in FIG. 1) having a substantially arc-shaped cross section are arranged.

In addition, an armature 24 around which a coil 23 is wound is arranged on the inner side of these magnets 22 in a manner of being rotatable via a predetermined gap. Then, an armature shaft 25 is fixed to the rotation center of the armature 24. A commutator 26 is arranged in a part near the center of the armature shaft 25 in the axial direction and close to the armature 24. The end of the coil 23 wound around the armature 24 is electrically connected to the commutator 26.

A pair of brushes 27 comes into sliding contact with the outer peripheral part of the commutator 26. These brushes 27 are held by a brush holder (not shown) that closes the opening part of the motor case 21, and are respectively brought into elastic contact with the commutator 26 by a spring force of a spring member 28. Thereby, a drive current is supplied to each brush 27 from an in-vehicle controller (not shown), and a rotation force (electromagnetic force) is generated in the armature 24. Accordingly, the armature shaft 25 is rotated in a predetermined rotation direction and at a predetermined rotation speed.

The bottom side (right side in FIG. 1) of the motor case 21 is formed in a stepped shape, and a bottomed stepped portion 21a smaller in the diameter than a main body potion of the motor case 21 is arranged in the stepped shape part. A first radial bearing 29 is mounted on the bottomed stepped portion 21a, and one axial side (right side in FIG. 1) of the armature shaft 25 is rotatably supported by the first radial bearing 29. In addition, a first thrust bearing 30 is arranged on the bottom side of the bottomed stepped portion 21a, and the first thrust bearing 30 restricts movement of the armature shaft 25 toward the axial direction.

Here, a second radial bearing 31 is mounted on a brush holder that is not shown, and a part of the armature shaft 25 near the center in the axial direction is rotatably supported by the second radial bearing 31.

The gear portion 40 includes a gear case 41 and a connector member 42 attached to the gear case 41. The gear case 41 is formed into a predetermined shape by injection molding a resin material such as plastic or the like, and is fixed to the opening side of the motor case 21 by three fastening screws 11 (see FIG. 2). Besides, the connector member 42 is fixed to the gear case 41 by a pair of fixing screws 43 (see FIG. 2) in a state wherein the front end side of the connector member 42 is inserted from the lateral side to the inside of the gear case 41.

The other axial side (left side in FIG. 1) of the armature shaft 25 extends inside the gear case 41, and a worm 44 is fixed to the other axial side and the outer peripheral part of the armature shaft 25. That is, the worm 44 is rotated by the armature shaft 25. In addition, a worm wheel 46 engaged with the worm 44 is rotatably stored inside the gear case 41. Here, as shown in FIG. 5, the worm 44 includes teeth 45 having a spiral shape, and the worm wheel 46 includes teeth 47 inclined at a gentle inclination angle in the axial direction thereof. Thereby, a rotation force of the worm 44 is smoothly transmitted to the worm wheel 46.

As shown in FIG. 1, on the other axial side of the armature shaft 25, a second thrust bearing 48 that restricts the movement of the armature shaft 25 toward the axial direction is arranged inside the gear case 41. In addition, the other axial side of the armature shaft 25 is rotatably supported by a third radial bearing 49.

As described above, the first radial bearing 29 and the first thrust bearing 30 are arranged on one axial side of the armature shaft 25, the second radial bearing 31 is arranged in the part of the armature shaft 25 near the center in the direction, and the third radial bearing 49 and the second thrust bearing 48 are arranged on the other axial side of the armature shaft 25, and thereby the armature shaft 25 (the armature 24) can rotate efficiently and smoothly.

A sensor magnet 50 having a ring shape is integrally arranged between the commutator 26 and the second radial bearing 31 along the axial direction of the armature shaft 25. The sensor magnet 50 is magnetized so that N poles and S poles alternately line up along the peripheral direction thereof. On the other hand, a sensor substrate 42a is mounted on the connector member 42, and a rotation sensor 42b is mounted on a part of the sensor substrate 42a facing the sensor magnet 50.

Here, the rotation sensor 42b is a magnetic sensor that captures the direction of magnetic flux lines of the sensor magnet 50 or changes in this direction. Thereby, the rotation sensor 42b detects a rotation state of the armature shaft 25, that is, the rotation direction or the rotation speed of the armature shaft 25. More specifically, the rotation sensor 42b is a GMR sensor that includes a magnetoresistive element (MR element) serving as a sensor element and further applies a giant magneto resistance effect.

The in-vehicle controller detects a detection signal from the rotation sensor 42b, and calculates the rotation state of the armature shaft 25. For example, when the rotation speed of the armature shaft 25 decreases, the in-vehicle controller determines that an obstacle is in contact with (is clamped in) the window glass. Then, control for stopping or reversing the rotation drive of the motor having deceleration mechanism 10 is executed.

As shown in FIG. 3, a support tube 41b by which the worm wheel 46 is rotatably supported is integrally arranged at a bottom 41a of the gear case 41. The support tube 41b protrudes to the inner side of the gear case 41, and an output shaft 71 forming the output member 70 is rotatably supported on the radial inner side of the support tube 41b. Then, the front end side (upper side in FIG. 3) of the output shaft 71 is exposed to the outside of the gear case 41.

As shown in FIGS. 3 and 4, a damper member 60 and the output member 70 are assembled to the worm wheel 46. The damper member 60 is formed of an elastic material such as rubber or the like, and includes a main body portion 61 having a ring shape and six damper pieces 62 integrally arranged in the main body portion 61. The six damper pieces 62 are arranged at substantially equal intervals (intervals of substantially 60°) in the peripheral direction of the main body portion 61, and protrudes toward the radial outer side of the main body portion 61. Here, the damper member 60 including the main body portion 61 and the six damper pieces 62 is stored in a storage portion SP of the worm wheel 46.

Then, between the adjacent damper pieces 62, three torque output portions 46a integrally arranged in the worm wheel 46, and three torque reception portions 72a (only two are shown in FIG. 4) integrally arranged in a disk member 72 of the output member 70 alternately interleaved with each other along the peripheral direction of the damper member 60. Thereby, when the worm wheel 46 is rotated in the forward and reverse directions, the rotation torque is transmitted from the torque output portion 46a to the torque reception portion 72a via the damper piece 62. At this time, the damper piece 62 is elastically deformed, and an impact caused by a sudden change in the rotation torque or the like is alleviated.

The output member 70 includes a substantially cylindrical output shaft 71 made of steel or the like, and a seal ring SR is arranged between the output shaft 71 and the support tube 41b. Thereby, entry of rainwater or the like from the bottom 41a side into the gear case 41 is prevented. In addition, a connection gear 71a is integrally arranged at the front end exposed outside the output shaft 71. Besides, a gear (not shown) forming a window regulator is connected to the connection gear 71a in a manner of capable of transmitting power.

The disk member 72 made of a resin material such as plastic or the like is fixed to the base end of the output shaft 71 stored in the gear case 41. More specifically, a base material 73 made of steel is embedded in the central part of the disk member 72 by insert-molding, and the base material 73 is fixed to the base end portion of the output shaft 71 by selection fitting (details are not shown). Thereby, the rotation force from the disk member 72 is efficiently transmitted to the output shaft 71. Besides, the disk member 72 is prevented from coming off from the output shaft 71 by a retaining ring R.

On the worm wheel 46 side (upper side in FIG. 3) of the disk member 72, the three torque reception portions 72a that are respectively interleaved between the adjacent damper pieces 62 are integrally arranged. These torque reception portions 72a are disposed at substantially equal intervals (intervals of substantially 120°) along the peripheral direction of the disk member 72. Here, the three torque reception portions 72a are stored in the storage portion SP of the worm wheel 46.

The opening side (lower side in FIG. 3) of the gear case 41 is sealed with a case cover 80. The case cover 80 is formed into a substantially disk shape by pressing a stainless steel plate or the like, and a convex portion 81 protruding toward the output shaft 71 side is arranged in the central part of case cover 80. The convex portion 81 slidably enters a concave portion 71b formed on the based end side of the output shaft 71. Thereby, entry of rainwater or the like from the opening side into the gear case 41 is prevented, and rotation runout of the output shaft 71 is suppressed.

Here, when a power transmission path of the motor having deceleration mechanism 10 is described, first, the rotation of the armature shaft 25 is decelerated by the worm 44 and the worm wheel 46 (a deceleration mechanism SD). Next, the high torque rotation force after the deceleration is transmitted from the torque output portion 46a to the torque reception portion 72a via the damper piece 62. Thereafter, the rotation force is output from the output shaft 71 to a gear arranged in the window regulator connected to the connection gear 71a, and the window glass is moved up and down.

The teeth 45 of the worm 44 forming the deceleration mechanism SD are formed into a spiral shape as shown in FIG. 5 and FIG. 6(a). In addition, as shown in the reference rack tooth profile of FIG. 6(a), the shape of the tooth 45 is the same on one side (right side in the drawing) and the other side (left side in the drawing) along the axial direction of the worm 44 with a line segment LN1 passing through the center of the tip of the tooth 45 as a boundary. Besides, the pressure angle of the teeth 45 of the worm 44 is set to [$\alpha°$ (=11°)] with reference to a second reference line B2 orthogonal to a first reference line (pitch circle diameter) B1 passing through a pitch point P1 of the reference rack tooth profile. Here, the pressure angle $\alpha°$ is an angle formed by the second reference line B2 and a tangent S1 of the surface of the teeth 45 passing through the pitch point P1.

Here, the worm 44 is made of steel (for example, S45C), and is manufactured with high precision by cutting. Accordingly, there is almost no dimensional variation even if the worm 44 is exposed to a low temperature environment or a high temperature environment. Therefore, the pressure angle of the teeth 45 is kept constant at [$\alpha°$ (=11°)] regardless of the environment in which the worm 44 is used.

On the contrary, the teeth 47 of the worm wheel 46 forming the deceleration mechanism SD is formed into a spur shape as shown in FIG. 5 and FIG. 6(b). In addition, as shown in the reference rack tooth profile of FIG. 6(b), the shape of the tooth 47 is the same on one side (right side in the drawing) and the other side (left side in the drawing) along the rotation direction of the worm wheel 46 with a line segment LN2 passing through the center of the tip of the tooth 47 as a boundary. Besides, the pressure angle of the teeth 47 of the worm wheel 46 is set to [$\beta°$ (=12°)] with reference to a second reference line (radius line) B4 orthogonal to a first reference line (pitch circle diameter) B3 passing through a pitch point P2 of the reference rack tooth profile. Here, the pressure angle $\beta°$, which is a theoretical design value, is an angle formed by the second reference line B4 and a tangent S2 of the surface of the teeth 47 passing through the pitch point P2.

Here, the worm wheel 46 is made of resin (for example, POM), and is formed (injection-molded) by injecting a molten resin material into a mold. Accordingly, dimensional errors occur among a plurality of teeth 47 when the resin is cooled and cured after the injection-molding, or dimensional variations occur when the temperature change in the usage environment is large. That is, the worm wheel 46 made of resin is superior in lightening but has a lower dimensional precision than the steel worm wheel.

Accordingly, the occurrence of these dimensional errors is prefetched and the degree of the dimensional errors is considered, and the pressure angle of the teeth 47 is set to [$\beta°$ (=12° larger than the pressure angle [$\alpha°$ (=11°)] of the teeth 45 of the worm 44 ($\beta° > \alpha°$). That is, by setting the pressure angle of the teeth 47 of the worm wheel 46 to [$\beta°$ (=12° as described above, as shown in FIG. 7, the tips of the teeth 47 (the pressure angle is large) becomes tapered compared with the teeth (the pressure angle is small) of the comparative example.

Here, the teeth of the comparative example (broken line in FIG. 7) are teeth having the same pressure angle (=11°) as the pressure angle [$\alpha°$ (=11°)] of the teeth 45 of the worm 44. That is, the teeth of the comparative example are, based on the normal design concept, the teeth in which the pressure angle of the teeth of the worm and the pressure angle of the teeth of the worm wheel are respectively set to the same angle, and in theory, the teeth in which the worm and the worm wheel can be properly engaged and rotate smoothly with each other.

Next, a state of engagement points between the teeth 45 of the worm 44 and the teeth 47 of the worm wheel 46 is described in detail with reference to the drawings.

Figure 8:
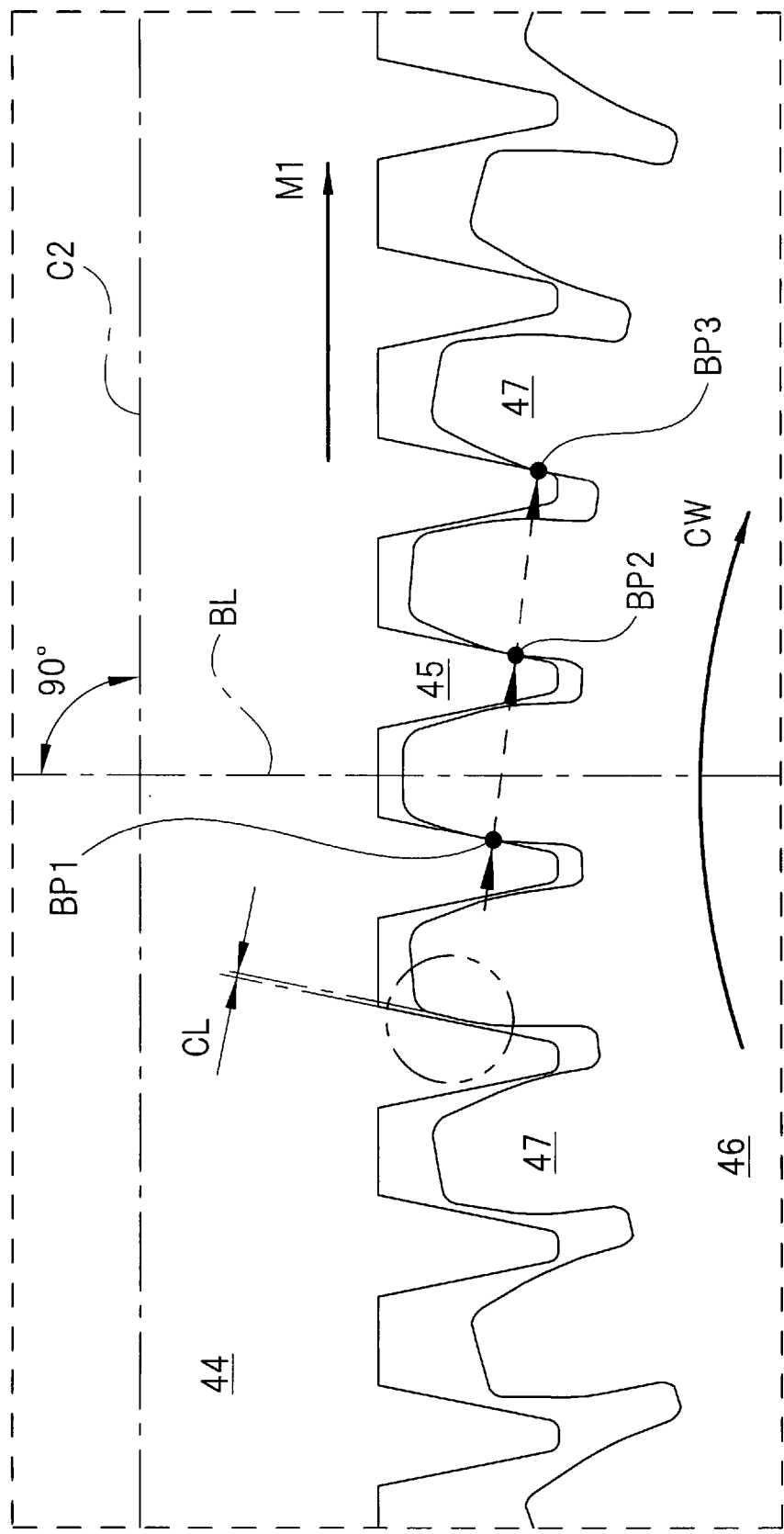
FIG. 8 is an illustration diagram illustrating engagement points when the worm wheel is rotated in a clockwise (CW) direction.
Figure 9:
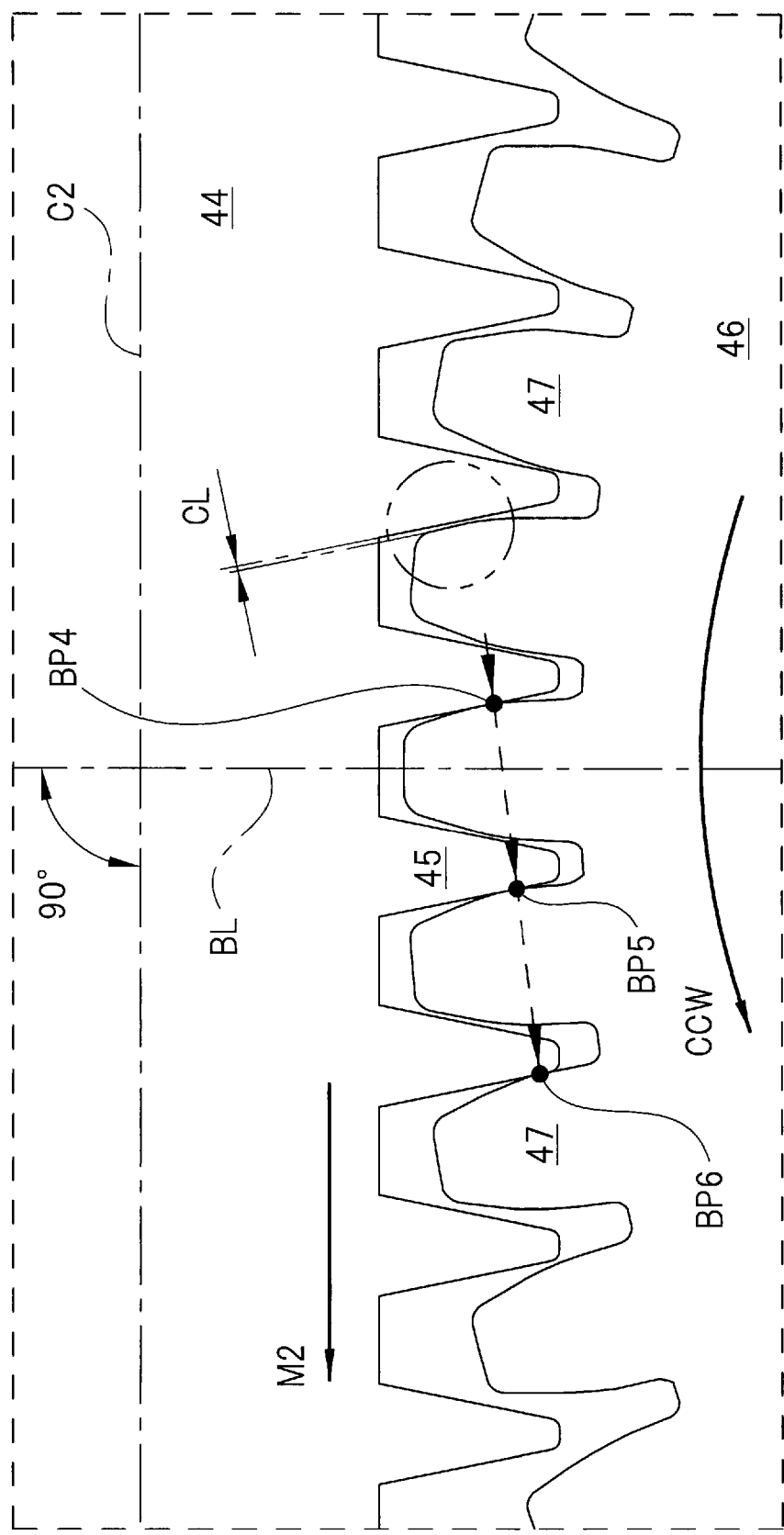
FIG. 9 is an illustration diagram illustrating engagement points when the worm wheel is rotated in a counterclockwise (CCW) direction.

FIG. 8 shows an illustration diagram illustrating engagement points when the worm wheel is rotated in the clockwise (CW) direction, and FIG. 9 shows an illustration diagram illustrating engagement points when the worm wheel is rotated in the counterclockwise (CCW) direction.

[Case of Rotation Toward Clockwise (CW) Direction]

As shown in FIG. 8, when the worm 44 is driven forward and the teeth 45 of the worm 44 move in the direction of an arrow M1, the worm wheel 46 is rotated in the direction of an arrow CW. Then, the engagement points between the teeth 45 of the worm 44 and the teeth 47 of the worm wheel 46 become BP1, BP2, and BP3 as shown by broken line arrows.

Here, in the embodiment, when the load state is constant, there are three engagement points, namely, BP1, BP2, and BP3, between the teeth 45 of the worm 44 and the teeth 47 of the worm wheel 46. In other words, when the engagement of the engagement point BP3 on the engagement end side is released, then, the engagement point BP1 appears on the engagement start side. This is repeated due to the forward drive of the worm 44, and thereby the number of engagement points is three.

Then, on the opposite side to the rotation direction side of the worm wheel 46 with respect to the engagement point BP1 on the engagement start side, a clearance (gap) CL is formed between the teeth 45 of the worm 44 and the teeth 47 of the worm wheel 46 as surrounded by a two-dot chain line circle. In the embodiment, since the pressure angle $\beta°$ (see FIG. 6(b)) of the teeth 47 of the worm wheel 46 is set larger than the pressure angle $\alpha°$ (see FIG. 6(a)) of the teeth 45 of the worm 44, the clearance CL is always formed during one rotation of the worm wheel 46.

In short, the tips of the teeth 47 of the worm wheel 46 are given a tapered shape as shown in FIG. 7, and thereby various sizes of clearances CL are reliably formed corresponding to the non-uniformity in the shape of the teeth 47 even if the dimensional precision of the teeth 47 of the worm wheel 46 is low. Accordingly, the number of engagement points can be three even in the case of the worm wheel 46 made of resin, and consequently, the non-uniformity in the rotation resistance of the deceleration mechanism SD caused by the increase or decrease of the engagement points as in past cases is reliably suppressed.

More specifically, as shown in FIGS. 5 and 8, when a line segment passing through an axial center C1 of the worm wheel 46 and orthogonal to an axial line C2 of the worm 44 is set as a reference line BL, the number of engagement points between the teeth 45 of the worm 44 and the teeth 47 of the worm wheel 46 is larger on the rotation direction side of the worm wheel 46 with respect to the reference line BL (right side in FIG. 8) than on the opposite side to the rotation direction side of the worm wheel 46 with respect to the reference line BL (left side in FIG. 8). In other words, there are "two places" of the engagement points BP2 and BP3 on the right side of the reference line BL in FIG. 8, and "one place" of the engagement point BP1 on the left side of the reference line BL in FIG. 8. Here, the reference line BL constitutes the reference line in the present invention.

As described above, in the embodiment, the number of engagement points on the engagement end side (right side of the reference line BL in FIG. 8) increases, and the engagement resistance (twisting force) between the teeth 45 of the worm 44 and the teeth 47 of the worm wheel 46 is smaller than in the case that the number of engagement points on the engagement start side (left side of the reference line BL in FIG. 8) is larger. Accordingly, the operating resistance of the deceleration mechanism SD can also be reduced.

[Case of Rotation Toward Counterclockwise (CCW) Direction]

In addition, as shown in FIG. 9, when the worm 44 is driven reversely and the teeth 45 of the worm 44 moves in the direction of an arrow M2, the worm wheel 46 is rotated in the direction of an arrow CCW. Then, the engagement points between the teeth 45 of the worm 44 and the teeth 47 of the worm wheel 46 become BP4, BP5, and BP6 as shown by broken line arrows.

In this case (CCW rotation), as in the case of the rotation toward the clockwise (CW) direction described above, the non-uniformity in the rotation resistance of the deceleration mechanism SD can also be reliably suppressed, and the operating resistance of the deceleration mechanism SD can be reduced. Besides, the detailed description is the same as the above description and thus is omitted.

Next, description is made on that the rotation resistance of the motor having deceleration mechanism 10 (the present invention) configured as described above is reduced and the non-uniformity decreases compared with the motor having deceleration mechanism of the comparative example (the previous structure). Besides, the comparative example is a motor having deceleration mechanism designed according to the normal design concept, in which the pressure angle of the teeth of the worm wheel is set to the same pressure angle of "11°" as the teeth of the worm.

In addition, in both the present invention (pressure angle 12°) and the comparative example (pressure angle 11°), data is acquired by driving under the same conditions. Specifically, the worm wheel is driven in the clockwise direction (CW direction) and the counterclockwise direction (CCW direction), and each operation is performed twice.

First, the magnitude of the current flowing to the motor having deceleration mechanism during one rotation of the worm wheel is measured. That is, when the current value is large, the operating resistance of the motor having deceleration mechanism (deceleration mechanism) is large, and when the current fluctuation is large, the non-uniformity in the rotation resistance of the motor having deceleration mechanism (deceleration mechanism) is large.

In the comparative example (pressure angle 11°), the magnitude of the current value is "medium", and the current fluctuation during the drive toward the CW direction is larger than the current fluctuation during the drive toward the CCW direction. That is, in the comparative example, the operating resistance is large and the non-uniformity in the rotation resistance is large.

The reason is that, in the comparative example, there is almost no "clearance CL" shown in FIGS. 8 and 9, and the teeth of the worm and the teeth of the worm wheel are variable in terms of contact or non-contact in the clearance CL during one rotation of the worm wheel. In other words, the reason is that the number of engagement points increases or decreases, varying between "three" and "four".

On the contrary, in the present invention (pressure angle 12°), the magnitude of the current value is lower than that of the comparative example, and there is little non-uniformity in the current fluctuation during the drive toward the CW direction and the CCW direction. That is, in the embodiment (the present invention), the operating resistance is smaller and the non-uniformity in the rotation resistance is smaller than in the comparative example. In other words, the present invention (pressure angle 12°) can be driven with less electrical power than the comparative example (pressure angle) 11°, and is also superior in the silence performance due to smooth drive.

Next, a measurement is made on how the detection signal from the rotation sensor 42b, that is, the "pulse signal" fluctuates during one rotation of the worm wheel. That is, the degree of non-uniformity in the detection signal from the rotation sensor 42b (=non-uniformity in the rotation resistance) is measured while the drive current is constant.

In the comparative example (pressure angle 11°), the pulse fluctuation is large in both the CW direction and the CCW direction. On the contrary, in the present invention (pressure angle 12°), the pulse fluctuation is smaller in both the CW direction and the CCW direction than in the comparative example.

That is, from the viewpoint of this pulse fluctuation, in the embodiment (the present invention), the non-uniformity in the rotation resistance is smaller than in the comparative example. In other words, in the present invention (pressure angle of 12°), it is possible to improve the detection precision of the clamping of object or the like compared with the comparative example (pressure angle of 11°). Accordingly, the misrecognition of the controller is suppressed, and it is effectively prevented that the motor portion is stopped during the opening and closing of the window glass.

As described above in detail, according to the motor having deceleration mechanism 10 of the embodiment, since the pressure angle $\beta°(=12°)$ of the teeth 47 of the worm wheel 46 is larger than the pressure angle $\alpha°$ (=11°) of the teeth 45 of the worm 44, as shown in FIG. 7, the tips of the teeth 47 of the worm wheel 46 can be more tapered as compared with a case in which the pressure angle of the teeth of the worm and the pressure angle of the teeth of the worm wheel are the same angle (the conventional form). Thereby, it is possible to ensure non-contact of the teeth, which had been variable in terms of contact and non-contact in the case of the conventional form, even if there has been non-uniformity in the teeth 47 of the worm wheel 46.

Accordingly, the number of the engagement points between the teeth 45 of the worm 44 and the teeth 47 of the worm wheel 46 during one rotation of the worm wheel 46 are set as three portions, namely BP1, BP2, and BP3 (BP4, BP5, and BP6), and the increase or decrease in this number is suppressed when the load state is constant, and the engagement between the worm 44 and the worm wheel 46 can be made smooth. Thus, the current fluctuation or the pulse fluctuation can be reduced, and more precise control can be performed.

In addition, according to the motor having deceleration mechanism 10 of the embodiment, since the worm 44 is made of steel and the worm wheel 46 is made of resin, the worm wheel 46 that is larger than the worm 44 and that occupies a large part of the volume of the motor having deceleration mechanism 10 can be lightened. Furthermore, since it is not necessary to improve the molding precision of the worm wheel 46, it is also possible to suppress an increase in the manufacturing cost. In addition, since the large parts can be lightened, the rotation inertia moment can be reduced, and the forward and reverse rotations can be switched quickly.

In addition, according to the motor having deceleration mechanism 10 of the embodiment, the shape of the teeth 47 of the worm wheel 46 is the same on one side and the other side along the rotation direction of the worm wheel 46, and thus the worm wheel 46 can be driven to rotate both in the clockwise direction (CW direction) and in the counterclockwise direction (CCW direction) under the same conditions. Thus, it is suitable for use in the drive source of the power window device or the like that is rotated forward and reversely.

In addition, according to the motor having deceleration mechanism 10 of the embodiment, when the line segment passing through the axial center C1 of the worm wheel 46 and orthogonal to the axial line C2 of the worm 44 is set as the reference line BL, the number of engagement points between the teeth 45 of the worm 44 and the teeth 47 of the worm wheel 46 is larger on the rotation direction side of the worm wheel 46 with respect to the reference line BL than on the opposite side to the rotation direction side of the worm wheel 46 with respect to the reference line BL.

Accordingly, the number of engagement points on the engagement end side (right side of the reference line BL in FIG. 8) can be set larger than the number of engagement points on the engagement start side (left side of the reference line BL in FIG. 8). Thus, it is possible to reduce the engagement resistance (twisting force) between the teeth 45 of the worm 44 and the teeth 47 of the worm wheel 46, and consequently reduce the operating resistance of the deceleration mechanism SD.

The present invention is not limited to the above embodiment, and various changes can be made without departing from the scope of the invention. For example, in the above embodiment, it is shown that the worm wheel 46 is formed by injection-molding the resin material such as plastic or the like, but the present invention is not limited hereto, and can also be applied to a worm wheel made of another material that may cause dimensional errors during cooling and curing, for example, a worm wheel formed by casting an aluminum material or the like.

In addition, in the above embodiment, it is shown that the motor having deceleration mechanism 10 is used in the drive source of the power window device mounted on the vehicle, but the present invention is not limited hereto, and can also be used in another drive source of a sunroof device, a wiper device, or the like.

Furthermore, in the above embodiment, it is shown that an electric motor with brush is employed in the motor portion 20, but the present invention is not limited hereto; for example, a brushless electric motor can also be employed in the motor portion 20.

In addition, the material, shape, dimension, number, installation location, and the like of each component in the above embodiment are arbitrary as long as the present invention can be achieved, and are not limited to the above embodiment.

INDUSTRIAL APPLICABILITY

The motor having deceleration mechanism is used in a drive source of a power window device or the like mounted on a vehicle such as an automobile or the like.

What is claimed is:

1. A motor having deceleration mechanism which decelerates and outputs rotation of an armature shaft, comprising:
   a worm rotated by the armature shaft, and
   a worm wheel engaged with the worm;
   wherein a first angle of a teeth of the worm wheel is larger than a second angle of a teeth of the worm,
   wherein the second angle of the teeth of the worm is defined as an angle formed between a first reference line and a first tangent line, the first reference line is orthogonal to a pitch circle diameter of the worm and extends from a first pitch point on the pitch circle diameter of the worm and extends away from the worm, the first pitch point is located on a surface of the teeth of the worm, the first tangent line extends from the first pitch point on the pitch circle diameter of the worm and extends away from the worm, the first tangent line is tangent to the surface of the teeth of the worm, the second angle of the teeth of the worm is an acute angle,
   wherein the first angle of the teeth of the worm wheel is defined as an angle formed between a second reference line and a second tangent line, the second reference line is orthogonal to a pitch circle diameter of the worm wheel and extends from a second pitch point on the pitch circle diameter of the worm wheel and extends away from the worm wheel, the second pitch point is located on a surface of the teeth of the worm wheel, the second tangent line extends from the second pitch point on the pitch circle diameter of the worm wheel and extends away from the worm wheel, the second tangent line is tangent to a surface of the teeth of the worm wheel, the first angle of the teeth of the worm wheel is an acute angle.

2. The motor having deceleration mechanism according to claim 1, wherein
   the worm is made of steel, and
   the worm wheel is made of resin.

3. The motor having deceleration mechanism according to claim 1, wherein
   the shape of the teeth of the worm wheel on one side towards a rotation direction of the worm wheel is symmetrical to an other side away from the rotation direction of the worm wheel.

4. The motor having deceleration mechanism according to claim 3, wherein
   when a line segment passing through an axial center of the worm wheel and orthogonal to an axial line of the worm is set as a reference line,
   the number of engagement points between the teeth of the worm and the teeth of the worm wheel is larger on the rotation direction side of the worm wheel with respect to the reference line than on the opposite side to the rotation direction side of the worm wheel with respect to the reference line.

5. The motor having deceleration mechanism according to claim 1, wherein the first pitch point is located on a surface of the teeth of the worm at a side of the teeth of the worm which is configured to contact the worm wheel.

* * * * *